(12) United States Patent
Roth et al.

(10) Patent No.: US 11,859,068 B2
(45) Date of Patent: Jan. 2, 2024

(54) POLYAMIDES WITH PHOSPHOROUS AND AL-PHOSPHONATES

(71) Applicant: BASF SE, Ludwigshafen am Rhein (DE)

(72) Inventors: Michael Roth, Ludwigshafen a (DE); Michaela Heussler, Ludwigshafen (DE); Klaus Uske, Ludwigshafen (DE); Christoph Minges, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 544 days.

(21) Appl. No.: 16/625,507

(22) PCT Filed: Jun. 21, 2018

(86) PCT No.: PCT/EP2018/066535
§ 371 (c)(1),
(2) Date: Dec. 20, 2019

(87) PCT Pub. No.: WO2018/234429
PCT Pub. Date: Dec. 27, 2018

(65) Prior Publication Data
US 2022/0002543 A1  Jan. 6, 2022

(30) Foreign Application Priority Data

Jun. 22, 2017 (EP) .................................. 17177360

(51) Int. Cl.
| | |
|---|---|
| *C08K 3/02* | (2006.01) |
| *C08J 5/18* | (2006.01) |
| *C08L 77/06* | (2006.01) |
| *C08K 3/32* | (2006.01) |
| *C08K 7/02* | (2006.01) |

(52) U.S. Cl.
CPC .................. *C08K 3/02* (2013.01); *C08J 5/18* (2013.01); *C08K 3/32* (2013.01); *C08K 7/02* (2013.01); *C08L 77/06* (2013.01); *C08J 2377/06* (2013.01); *C08J 2423/08* (2013.01); *C08K 2003/026* (2013.01); *C08K 2003/327* (2013.01); *C08L 2203/12* (2013.01); *C08L 2203/16* (2013.01)

(58) Field of Classification Search
CPC .... C08K 2003/026; C08K 3/32; C08K 3/321; C08K 3/327; C08K 2003/321–329
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 4,360,617 A | 11/1982 | Mueller et al. | |
| 4,408,036 A | 10/1983 | Gaymans et al. | |
| 4,446,304 A | 5/1984 | Gaymans et al. | |
| 4,460,762 A | 7/1984 | Gaymans et al. | |
| 5,049,599 A | 9/1991 | Steiert et al. | |
| 6,194,538 B1 | 2/2001 | Weiss et al. | |
| 6,699,960 B1 | 3/2004 | Ohlbach et al. | |
| 2007/0093584 A1* | 4/2007 | Hoerold | C08K 3/32 524/414 |
| 2009/0001222 A1 | 1/2009 | McKeon | |
| 2014/0336325 A1 | 11/2014 | Bauer et al. | |
| 2016/0009918 A1* | 1/2016 | Hoerold | C08K 3/32 524/133 |
| 2016/0053115 A1* | 2/2016 | Roth | C08L 77/00 524/133 |
| 2016/0322738 A1* | 11/2016 | Krijgsman | H01B 3/47 |

FOREIGN PATENT DOCUMENTS

| | | |
|---|---|---|
| DE | 2702661 C2 | 8/1987 |
| DE | 19648503 A1 | 5/1998 |
| DE | 10313681 A1 | 10/2004 |
| EP | 38094 B1 | 7/1984 |
| EP | 0129195 A2 | 12/1984 |
| EP | 0129196 A2 | 12/1984 |
| EP | 38582 B1 | 8/1985 |
| EP | 0299444 A2 | 1/1989 |
| EP | 39524 B2 | 4/1989 |
| EP | 176836 B1 | 2/1991 |
| EP | 384232 B1 | 1/1995 |
| EP | 922065 B1 | 11/2002 |
| EP | 1198491 B1 | 10/2003 |
| EP | 1994075 B1 | 9/2009 |

(Continued)

OTHER PUBLICATIONS

Written Opinion and International Search Report of corresponding PCT/EP2018/066535 dated Jul. 20, 2018, 13 pages.

(Continued)

*Primary Examiner* — Ana L. Woodward
(74) *Attorney, Agent, or Firm* — Armstrong Teasdale LLP

(57) ABSTRACT

Described herein are thermoplastic molding materials including components:

A) 10 to 98.5 wt % of a thermoplastic polyamide,

B) 1 to 20 wt % of red phosphorus,

C) 0.5 to 15 wt % of an aluminum salt of phosphonic acid,

D) 0 to 55 wt % of a fibrous or particulate filler or mixtures thereof,

E) 0 to 30 wt % of further additives, wherein the weight percentages of the components A) to E) sum to 100%.

10 Claims, No Drawings

(56) References Cited

FOREIGN PATENT DOCUMENTS

| | | |
|---|---|---|
| EP | 3034553 A1 | 6/2016 |
| JP | 2004204194 A | 7/2004 |
| JP | 2013116982 A | 6/2013 |
| JP | 2013194196 A | 9/2013 |
| JP | 2015529270 A | 10/2015 |
| WO | 2013083247 A1 | 6/2013 |
| WO | 2014135256 A1 | 9/2014 |
| WO | 2014170148 A1 | 10/2014 |
| WO | 2018069055 A1 | 4/2018 |
| WO | 2018158224 A1 | 9/2018 |

OTHER PUBLICATIONS

European Search Report for EP Patent Application No. 17177360.9, dated Nov. 22, 2017, 3 pages.

* cited by examiner

POLYAMIDES WITH PHOSPHOROUS AND AL-PHOSPHONATES

CROSS-REFERENCE TO RELATED APPLICATIONS

This application is the national stage entry of PCT/EP2018/066535, filed on Jun. 21, 2018, which claims the benefit of priority to European Patent Application No. 17177360.9, filed Jun. 22, 2017, each of which is incorporated by reference in its entirety herein.

FIELD OF THE INVENTION

The invention relates to thermoplastic molding materials comprising
A) 10 to 98.5 wt % of a thermoplastic polyamide,
B) 1 to 20 wt % of red phosphorus,
C) 0.5 to 15 wt % of an aluminum salt of phosphonic acid,
D) 0 to 55 wt % of a fibrous or particulate filler or mixtures thereof,
E) 0 to 30 wt % of further additives,
wherein the weight percentages A) to E) sum to 100%.

The present invention further relates to flame retardant molding materials composed of these polyamide mixtures and to the use of such molding materials for the production of fibers, films and moldings, and to the resultant moldings, fibers and films of any type.

BACKGROUND

Red phosphorus has long been known as an extremely effective flame retardant especially for glass-fiber-reinforced polyamides and an array of further plastics. However, for a very wide variety of applications plastic molding materials provided with more than just high flame retardancy are required. Instead, particularly in the case of demanding applications in the electrical and electronics sectors, adjustment of material characteristics to achieve a balanced product profile consisting of high flame retardancies coupled with very good mechanical and glow wire resistance takes on ever increasing importance.

Especially in thin-walled component parts, which are for example provided with highly stressed snap-fits, it is important for the employed materials especially to have good elongation values but also to be highly robust in terms of their toughness.

Compared to similar compositions without flame retardants, glass-fiber-reinforced polyamide compounds comprising halogen-free flame retardants generally exhibit reduced mechanical properties, in particular for breaking elongation and impact strength. However, the addition of impact modifiers based on olefin (co)polymers in many cases result in severely reduced flame retardancy properties, in particular insufficient glow wire resistance.

WO 2013/083247 discloses flame retardants based on phosphites which are generally employable for thermoplastics in combination with dialkylphosphinic acids. However, the mechanics and the glow wire test are in need of improvement.

DETAILED DESCRIPTION

The present invention accordingly had for its object to provide halogen-free flame-retarded thermoplastic molding materials which achieve efficient flame retardancy—especially glow wire resistance—and better mechanical properties by addition of Al phosphites of various compositions to red phosphorus.

The molding materials defined in the introduction have accordingly been found. Preferred embodiments may be found in the dependent claims.

The molding materials of the invention comprise as component A) 10 to 98.5 wt %, preferably 20 to 97.5 wt % and in particular 30 to 80 wt % of at least one polyamide.

The polyamides of the molding materials according to the invention generally have an intrinsic viscosity of 90 to 350 ml/g, preferably 110 to 240 ml/g, determined in a 0.5 wt % solution in 96 wt % sulfuric acid at 25° C. according to ISO 307.

Preference is given to semicrystalline or amorphous resins with molar mass Mw (weight average) at least 5000 of the type described by way of example in the U.S. Pat. Nos. 2,071,250, 2,071,251, 2,130,523, 2,130,948, 2,241,322, 2,312,966, 2,512,606 and 3,393,210.

Examples thereof are polyamides which derive from lactams having 7 to 13 ring members, such as polycaprolactam, polycaprylolactam and polylaurolactam, and also polyamides obtained by reaction of dicarboxylic acids with diamines.

Employable dicarboxylic acids include alkanedicarboxylic acids having 6 to 12 carbon atoms, in particular 6 to 10 carbon atoms, and aromatic dicarboxylic acids. These only include the acids adipic acid, azelaic acid, sebacic acid, dodecanedioic acid and terephthalic and/or isophthalic acid.

Particularly suitable diamines are alkanediamines having 6 to 12 carbon atoms, in particular 6 to 8 carbon atoms, and also m-xylylenediamine (e.g. Ultramid® X17 from BASF SE, a 1:1 molar ratio of MXDA to adipic acid), di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also 6/66 copolyamides, in particular having a proportion of from 5 to 95 wt % of caprolactam units (for example Ultramid® C31 from BASF SE).

Suitable polyamides further include those obtainable from w-aminoalkyl nitriles, for example aminocapronitrile (PA 6) and adipodinitrile with hexamethylenediamine (PA 66) by so-called direct polymerization in the presence of water, as described for example in DE-A 10313681, EP-A 1198491 and EP 922065.

Also included are polyamides obtainable for example by condensation of 1,4-dianninobutane with adipic acid at elevated temperature (polyamide 4,6). Production processes for polyamides having this structure are described for example in EP-A 38094, EP-A 38582 and EP-A 39524.

Also suitable are polyamides obtainable by copolymerization of two or more of the abovementioned monomers or mixtures of a plurality of polyamides in any desired mixing ratio. Particular preference is given to mixtures of polyamide 66 with other polyamides, in particular 6/66 copolyamides.

Semiaromatic copolyamides such as PA 6/6T and PA 66/6T having a triamine content of less than 0.5 wt %, preferably less than 0.3 wt %, (see EP-A 299444) have also proven particularly advantageous. Further high-temperature-resistant polyamides are disclosed in EP-A 1994075 (PA 6T/61/MXD6).

Production of the preferred semiaromatic copolyamides having a low triamine content may be carried out by the processes described in EP-A 129195 and 129196.

The following nonexhaustive list comprises the recited polyamides and other polyamides A) in the context of the invention and also the monomers present.

AB Polymers:

| PA 6 | ε-caprolactam |
| PA 7 | enantholactam |
| PA 8 | caprylolactam |
| PA 9 | 9-aminopelargonic acid |
| PA 11 | 11-aminoundecanoic acid |
| PA 12 | laurolactam |

AA/BB Polymers

| PA 46 | tetramethylenediamine, adipic acid |
| PA 66 | hexamethylenediamine, adipic acid |
| PA 69 | hexamethylenediamine, azelaic acid |
| PA 610 | hexamethylenediamine, sebacic acid |
| PA 612 | hexamethylenediamine, decanedicarboxylic acid |
| PA 613 | hexamethylenediamine, undecanedicarboxylic acid |
| PA 1212 | 1,12-dodecanediamine, decanedicarboxylic acid |
| PA 1313 | 1,13-diaminotridecane, undecanedicarboxylic acid |
| PA 6T | hexamethylenediamine, terephthalic acid |
| PA 9T | 1,9-nonanediamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, dodecanedioic acid |
| PA 6I/6T/PACM | such as PA 6I/6T + diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |
| PA410 | 1,4-tetramethylenediamine, sebacic acid |
| PA510 | 1,5-pentamethylenediamine, sebacic acid |
| PA10T | 1,10-decanediamine, terephthalic acid |

The molding materials of the invention comprise as component B) 1 to 50 wt %, in particular 1 o 20 wt %, preferably 1 to 10 wt % and in particular 2 to 8 wt % of red phosphorus.

A preferred halogen-free flame retardant B), in particular in combination with glass-fiber-reinforced molding materials, is elemental red phosphorus which may be employed in untreated form.

Particularly suitable, however, are preparations in which the phosphorus is surface-coated with low molecular weight liquid substances such as silicone oil, paraffin oil or esters of phthalic acid (in particular dioctyl phthalate, see EP 176836) or adipic acid or with polymeric or oligomeric compounds, for example with phenol resins or aminoplasts and also polyurethanes (see EP-A 384232, DE-A 19648503). Such so-called phlegmatizers are generally present in amounts of 0.05 to 5 wt % based on 100 wt % of B).

Concentrates of red phosphorus, for example in a polyamide A) or elastomer E), are also suitable flame retardants. Polyolefin homopolymers and copolymers in particular are suitable concentrate polymers. However, if no polyamide is used as the thermoplastic the proportion of the concentrate polymer should not exceed 35 wt % based on the weight of components A) to E) in the molding materials according to the invention.

Preferred concentrate compositions are 30 to 90 wt %, preferably from 45 to 70 wt %, of a polyamide A) or elastomer (E), 10 to 70 wt %, preferably from 30 to 55 wt %, of red phosphorus (B).

The employed polyamide for the batch may be distinct from A) or preferably identical to A) so that incompatibilities or melting point differences do not have a negative effect on the molding material.

The average particle size ($d_{50}$) of the phosphorus particles distributed in the molding materials is preferably in the range from 0.0001 to 0.5 mm; in particular from 0.001 to 0.2 mm.

The molding materials of the invention comprise as component C) 0.5 to 15 wt %, preferably 0.5 to 13 wt % and in particular 1 to 10 wt % of at least one aluminum salt of a phosphonic acid.

Phosphonic acid is to be understood as meaning the compound having the empirical formula H3PO3 [CAS Nro. 13598-36-2]. The salts of phosphonic acid are known as phosphonates. Phosphonic acid may be in the form of two tautomeric forms of which the tribonded form has a free electron pair on the phosphorus atom and the tetrabonded form has an oxygen double bonded to the phosphorus (P=O). The tautomeric equilibrium is entirely on the side of the form having the double bonded oxygen.

According to A. F. Holleman, E. Wiberg: Lehrbuch der Anorganischen Chemie, 101st edition, Walter de Gruyter, Berlin/New York 1995, ISBN 3-11-012641-9, page 764 the terms "phosphorous acid" and "phosphites" should only be used for the tribonded forms. Even in current literature the terms "phosphorous acid" and "phosphites" are also used for the tetrabonded forms having oxygen double bonded to the phosphorus (P=O) and the terms phosphonic acid and phosphorous acid and phosphonates and phosphites are therefore used syn-onymously with one another.

Preferred components C) are constructed from

   (formula I)

where q=0 to 4 or

   (formula II)

where
M represents alkali metal ions
a=0.01 to 1.5
b=2.63 to 3.5
c=0 to 2
d=0 to 4
or $$Al_2(HPO_3)_e(H_2PO_3)_f \cdot (H_2O)_g \quad \text{(formula III)}$$

where
e=2 to 2.99
f=2 to 0.01
g=0 to 4
or mixtures of aluminum phosphites and aluminum oxide of the type $Al_2(HPO_3)_3 x 0.1$ to $30 Al_2O_3 x 0$ to $50 H_2O$     (formula IV)

or primary aluminum phosphonate$[Al(H_2PO_3)_3]$   (formula V)

or basic aluminum phosphonate$[Al(OH)(H_2PO_3)x \cdot 2H_2O]$   (formula VI)

or mixtures thereof.

Preferred molding materials comprise as component C) compounds of formula II, in which M represents sodium and/or potassium.

Preferred compounds of formula I are secondary aluminum phosphonate$[Al_2(HPO_3)_3]$   (formula Ia)

or aluminum phosphonate tetrahydrate$[Al_2(HPO_3)_3 \cdot 4H_2O]$   (formula Ib)

or mixtures thereof.

Preferred compounds of formula IV are constructed from mixtures of aluminum phosphites and aluminum oxide of the type $Al_2(HPO_3)_3 x$ 0.2 to 20 $Al_2O_3$ x 0 to 50 $H_2O$ (formula IV) and very particularly preferably $Al_2(HPO_3)_3 x 1$ to 3 $Al_2O_3 x$ 0 to 50 $H_2O$.

Preferred compounds C) of formula II are those in which a represents 0.15 to 0.4 and b represents 2.80 to 3 and c represents 0.01 to 0.1.

Further preferred components C) are constructed from compounds of formula III in which e represents 2.834 to 2.99 and f represents 0.332 to 0.03 and g represents 0.01 to 0.1.

Especially preferred compounds C) are those of formula II or III, wherein a, b and c and also e and f can only assume numbers such that the corresponding aluminum salt of phosphonic acid is uncharged overall.

Aluminum phosphites having the CAS numbers 15099-32-8, 119103-85-4, 220689-59-8, 56287-23-1, 156024-71-4 (secondary aluminum phosphonate tetrahydrate), 71449-76-8 (secondary aluminum phosphonate) and 15099-32-8 are particularly preferred.

The described aluminum salts of phosphonic acid may be employed individually or in admixture.

It is preferable when the aluminum phosphites have particle sizes of 0.2 to 100 pm, the particle size distribution thereof being determinable by customary analytical methods of laser diffraction Production of the preferred aluminum phosphites is typically carried out by reaction of an aluminum source with a phosphorus source in a solvent at 20° C. to 200° C. over a time span of up to 4 days. To this end the aluminum source and the phosphorus source are mixed, heated under hydrothermal conditions or under reflux, filtered off, washed and dried. The preferred solvent here is water.

The production of the aluminum salts of phosphonic acid used as component C) according to the invention is derivable for example from WO 2013/083247.

Examples of fibrous or particulate fillers D) include carbon fibers, glass fibers, glass beads, amorphous silica, calcium silicate, calcium metasilicate, magnesium carbonate, kaolin, chalk, pulverulent quartz, mica, barium sulfate and feldspar, which may be employed in amounts of from 0 to 55 wt %, preferably from 1 to 50 wt %, in particular 5 to 40 wt %.

Preferred fibrous fillers include carbon fibers, aramid fibers and potassium titanate fibers, wherein glass fibers in the form of E glass are particularly preferred. These may be employed as rovings or chopped glass in the commercially customary forms.

The fibrous fillers may have been surface-pretreated with a silane compound in order to improve compatibility with the thermoplastics.

Suitable silane compounds are those of general formula $$(X-(CH_2)_n)_k-Si-(O-C_mH_{2m}H_{2m+1})_{4-k}$$

in which the substituents are defined as follows:

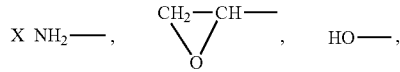

n an integer from 2 to 10, preferably from 3 to 4
m an integer from 1 to 5, preferably from 1 to 2
k an integer from 1 to 3, preferably 1.

Preferred silane compounds are aminopropyltrimethoxysilane, aminobutyltrimethoxysilane, aminopropyltriethoxysilane, aminobutyltriethoxysilane and also the corresponding silanes which comprise a glycidyl group as substituent X.

The silane compounds are generally used for surface coating in amounts of from 0.01 to 2 wt %, preferably 0.025 to 1.0 wt % and in particular 0.05 to 0.5 wt % (based on D).

Acicular mineral fillers are also suitable.

In the context of the invention acicular mineral fillers are to be understood as meaning a mineral filler having distinctly acicular character. One example is acicular wollastonite. The L/D (length to diameter) ratio of the mineral is preferably 8:1 to 35:1, preferably from 8:1 to 11:1. The mineral filler may optionally have been pretreated with the abovementioned silane compounds but pretreatment is not an essential requirement.

Examples of further fillers include kaolin, calcined kaolin, wollastonite, talc and chalk, precipitat-ed calcite and also lamellar or acicular nanofillers, preferably in quantities of from 0.1 to 10%. Materials preferably used for this purpose are mica, böhmite, bentonite, montmorillonite, ver-miculite, zinc oxide in acicular form and hectorite. In order to obtain good compatibility between the lamellar nanofillers and the organic binder the lamellar nanofillers are subjected to organic modification according to the prior art. Addition of the lamellar or acicular nanofillers to the nanocomposites of the invention leads to a further increase in mechanical strength.

As component E) the molding materials may comprise further additives in amounts of 0 to 30 wt %, preferably 0 to 25 wt %.

Contemplated here in amounts of 1 to 15 wt %, preferably 1 to 10 wt %, in particular 1 to 8 wt %, are elastomeric polymers (often also referred to as impact modifiers, elastomers or rubbers).

These are very generally copolymers preferably constructed from at least two of the following monomers: ethylene, propylene, butadiene, isobutene, isoprene, chloroprene, vinyl acetate, styrene, acrylonitrile and (meth)acrylate having from 1 to 18 carbon atoms in the alcohol component.

Such polymers are described by way of example in Houben-Weyl, Methoden der organischen Chemie [Methods of organic chemistry], vol. 14/1 (Georg-Thieme-Verlag, Stuttgart, 1961), pag-es 392 to 406, and in the monograph "Toughened Plastics" (Applied Science Publishers, London, 1977) by C. B. Bucknall.

Some preferred types of these elastomers are set out below:

Preferred components E) are impact modifiers based on ethylene copolymers constructed from:

$E1$) 40 to 98 wt %, preferably 50 to 94.5 wt %, of ethylene, $E2$) 2 to 40 wt %, preferably 5 to 40 wt %, of a (meth)acrylate having 1 to 18 carbon atoms, or/and $E3$) 0 to 20 wt %, preferably 0.05 to 10 wt %, of functional monomers selected from the group of ethylenically unsaturated mono- or dicarboxylic acids
  or of carboxylic anhydrides or epoxy groups or mixtures thereof, wherein the percentages by weight of $E_1$) to $E_3$) sum to 100%,
or
an ethylene-(meth)acrylic acid copolymer which has been up to 72% zinc-neutralized.

Particular preference is given to ethylene copolymers constructed from:

$E_1$) 50 to 69.9 wt % of ethylene $E_2$) 30 to 40 wt % of a (meth)acrylate having 1 to 18 carbon atoms, $E_3$) 0.1 to 10 wt % of functional monomers according to claim 1,
  wherein the weight percentages $E_1$) to $E_3$) sum to 100%.

The proportion of functional groups $E_3$) is 0.05 to 5 wt %, preferably 0.2 to 4 wt %, and in particular 0.3 to 3.5 wt % based on 100 wt % of E).

Particularly preferred components E3) are constructed from of an ethylenically unsaturated mono- or dicarboxylic acid or from a functional derivative of such an acid.

In principle, any of the primary, secondary and tertiary $C_1$-$C_{18}$-alkyl esters of acrylic acid or methacrylic acid $D_2$ is suitable, but preference is given to esters having 1-12 carbon atoms, in particular having 2-10 carbon atoms.

Examples thereof include methyl, ethyl, propyl, n-butyl, isobutyl and tert-butyl, 2-ethylhexyl, oc-tyl and decyl acrylates and the corresponding esters of methacrylic acid. Among these, particular preference is given to n-butyl acrylate and 2-ethylhexyl acrylate.

In addition to the esters the olefin polymers may also comprise acid-functional and/or latently acid-functional monomers of ethylenically unsaturated mono- or dicarboxylic acids or may comprise epoxy-containing monomers.

Further examples of monomers $E_3$) include acrylic acid, methacrylic acid, tertiary alkyl esters of these acids, in particular butyl acrylate, and dicarboxylic acids such as maleic acid and fumaric acid or anhydrides of these acids and also the monoesters thereof.

"Latently acid-functional monomers" is to be understood as meaning compounds which form free acid groups under the polymerization conditions or during incorporation of the olefin polymers into the molding materials. Examples include anhydrides of dicarboxylic acids having up to 20 carbon atoms, in particular maleic anhydride, and tertiary $C_1$-$C_{12}$-alkyl esters of the abovementioned acids, in particular tert-butyl acrylate and tert-butyl methacrylate.

The production of the above-described ethylene copolymers may be effected by processes known per se, preferably by random copolymerization at high pressure and elevated temperature.

The melt flow index of the ethylene copolymers is generally in the range from 1 to 80 g/10 min (measured at 190° C. under a load of 2.16 kg).

The molecular weight of these ethylene copolymers is from 10000 to 500000 g/mol, preferably from 15000 to 400000 g/mol (Mn determined by GPC in 1,2,4-trichlorobenzene with PS cali-bration).

Commercially available products preferably used are Fusabond® A 560, Lucalen® A 2910, Lucalen® A 3110, Nucrel 3990, Nucrel 925, Lotader AX9800, and Igetabond FS 7M.

The above-described ethylene copolymers may be produced by processes known per se, preferably by random copolymerization at high pressure and elevated temperature. Corresponding processes are well known.

Other preferred elastomers are emulsion polymers whose production is described for example by Blackley in the monograph "Emulsion Polymerization". The emulsifiers and catalysts that may be used are known per se.

Copolymers comprising no units $E_2$) but where the acid component $E_3$) has been neutralized with Zn are especially preferred. Preference is given here to ethylene-(meth)acrylic acid copolymers which have been up to 72% zinc-neutralized (commercially available as Surlyn® 9520 from DuPont).

It will be appreciated that it is also possible to use mixtures of the rubber types listed above.

Further additives E) may be present in amounts up to 30 wt %, preferably up to 20 wt %.

As component E) the molding materials according to the invention may comprise 0.05 to 3 wt %, preferably 0.1 to 1.5 wt % and in particular 0.1 to 1 wt % of a lubricant.

Preference is given to Al salts, alkali metal salts, alkaline earth metal salts or esters or amides of fatty acids having from 10 to 44 carbon atoms, preferably having from 12 to 44 carbon atoms.

The metal ions are preferably alkaline earth metal and Al, wherein Ca or Mg are particularly preferred.

Preferred metal salts are Ca stearate and Ca montanate and also Al stearate.

It is also possible to use mixtures of different salts in any desired mixing ratio.

The carboxylic acids may be mono- or dibasic. Examples include pelargonic acid, palmitic acid, lauric acid, margaric acid, dodecanedioic acid, behenic acid, and particularly preferably stearic acid, capric acid and montanic acid (mixture of fatty acids having from 30 to 40 carbon atoms).

The aliphatic alcohols may be mono- to tetrahydric. Examples of alcohols include n-butanol, n-octanol, stearyl alcohol, ethylene glycol, propylene glycol, neopentyl glycol, and pentaerythritol, preference being given here to glycerol and pentaerythritol.

The aliphatic amines may be mono- to trifunctional. Examples thereof are stearylamine, ethylenediamine, propylenediamine, hexamethylenediamine, and di(6-aminohexyl)amine, wherein ethylenediamine and hexamethylenediamine are particularly preferred. Preferred esters or amides are correspondingly glyceryl distearate, glyceryl tristearate, ethylenediamine distearate, glyceryl monopalmitate, glyceryl trilaurate, glyceryl monobehenate and pentaerythrityl tetrastearate.

It is also possible to use mixtures of different esters or amides or esters combined with amides in any desired mixing ratio.

As component E) the molding materials according to the invention may comprise 0.05 to 3, preferably 0.1 to 1.5 and in particular 0.1 to 1 wt % of a Cu stabilizer, preferably of a copper(I) halide, in particular in admixture with an alkali metal halide, preferably KI, in particular in a ratio of 1:4.

Suitable salts of monovalent copper preferably include copper(I) complexes with PPh$_3$, copper(I) acetate, copper(I) chloride, bromide and iodide. These are present in amounts of 5 to 500 ppm of copper, preferably 10 to 250 ppm, based on polyamide.

The advantageous properties are in particular obtained when the copper is in the form of a molecular dispersion in the polyamide. This is achieved when a concentrate comprising polyamide, a salt of monovalent copper and an alkali metal halide in the form of a solid homogeneous solution is added to the molding material. A typical concentrate consists for example of 79 to 95 wt % of polyamide and 21 to 5 wt % of a mixture of copper iodide or bromide and potassium iodide. The concentration of copper in the solid homogeneous solution is preferably between 0.3 and 3, in particular between 0.5 and 2, wt % based on the total weight of the solution and the molar ratio of copper(I) iodide to potassium iodide is between 1 and 11.5, preferably between 1 and 5.

Suitable polyamides for the concentrate are homopolyamides and copolyamides, in particular polyamide 6 and polyamide 6.6.

Suitable sterically hindered phenols E) include in principle all compounds having a phenolic structure and having at least one sterically demanding group on the phenolic ring.

Preferably contemplated compounds are for example compounds of formula

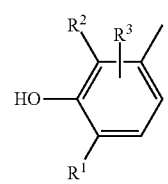

in which:

$R^1$ and $R^2$ represent an alkyl group, a substituted alkyl group or a substituted triazole group, wherein the radicals $R^1$ and $R^2$ may be identical or different and $R^3$ represents an alkyl group, a substituted alkyl group, an alkoxy group or a substituted amino group.

Antioxidants of the recited type are described for example in DE-A 2702661 (U.S. Pat. No. 4,360,617).

Another group of preferred sterically hindered phenols derives from substituted benzenecarbox-ylic acids, in particular from substituted benzenepropionic acids.

Particularly preferred compounds from this class are compounds of the formula

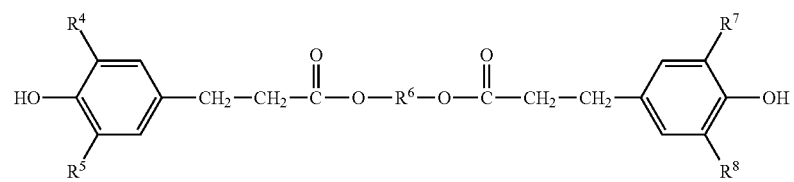

wherein $R^4$, $R^5$, $R^7$ and $R^8$ independently of one another represent $C_1$-$C_8$ alkyl groups which may themselves be substituted (at least one thereof being a sterically demanding group), and $R^6$ represents a divalent aliphatic radical which has from 1 to 10 carbon atoms and which may also have C—O bonds in the main chain.

Preferred compounds of this formula are (Irganox® 245 from BASF SE)

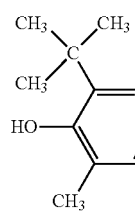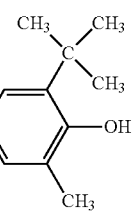

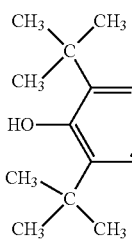 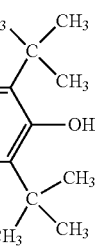 (Irganox® 259 from BASF SE)

Sterically hindered phenols altogether include for example:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds that have proven particularly effective and are therefore used with preference are 2,2'-methylenebis(4-methyl-6-tert-butylphenyl), 1,6-hexanediol bis[3-(3,5-di-tert-butyl-4-hydroxyphenyl)propionate] (Irganox® 259), pentaerythrityl tetrakis[3-(3,5-di-tert-butyl-4-hydroxyphenyl)propionate] and also N,N'-hexamethylenebis-3,5-di-tert-butyl-4-hydroxyhydrocinnamide (Irganox® 1098) and the above-described Irganox® 245 from BASF SE which is particularly suitable.

The antioxidants E) which may be employed individually or as mixtures are present in an amount of 0.05 up to 3 wt %, preferably from 0.1 to 1.5 wt %, in particular 0.1 to 1 wt %, based on the total weight of the molding materials A) to E).

In some cases, sterically hindered phenols having not more than one sterically hindered group in the ortho-position to the phenolic hydroxy group have proven particularly advantageous, in particular when colorfastness is assessed during storage in diffuse light for prolonged periods. As component E) the molding materials according to the invention may comprise 0.05 to 5, preferably 0.1 to 2 and in particular 0.25 to 1.5 wt % of a nigrosin.

Nigrosins are generally understood to refer to a group of black or gray phenazine dyes (azine dyes) in various embodiments (water-soluble, liposoluble, gasoline-soluble), and are related to the indulines, and are used in wool dyeing and printing, for providing black color to silks, and for dyeing leather and for shoe polishes, varnishes, plastics, heat-cured coatings, inks and the like, and also as microscopy dyes.

Nigrosins are obtained industrially by heating nitrobenzene, aniline and aniline hydrochloride with metallic iron and FeCl$_3$ (name derives from the Latin *niger*=black).

Component E) may be used as the free base or else as a salt (for example hydrochloride).

Further details relating to nigrosins may be found for example in the electronic encyclopedia Rompp Online, Version 2.8, Thieme-Verlag Stuttgart, 2006, keyword "Nigrosin".

As component E) the thermoplastic molding materials according to the invention may comprise customary processing aids such as stabilizers, oxidation retarders, agents to counteract thermal degradation and ultraviolet light degradation, lubricants and release agents, colorants such as dyes and pigments, nucleating agents, plasticizers, etc.

Examples of oxidation retarders and heat stabilizers are sterically hindered phenols and/or phosphites and amines (e.g. TAD), hydroquinones, aromatic secondary amines such as diphe-nylamines, various substituted representatives of these groups and mixtures thereof in concen-trations of up to 1 wt % based on the weight of the thermoplastic molding materials.

Examples of UV stabilizers, which are generally employed in amounts of up to 2 wt % based on the molding material, include various substituted resorcinols, salicylates, benzotriazoles and benzophenones.

Colorants that may be added include inorganic pigments, such as titanium dioxide, ultramarine blue, iron oxide and carbon black, and organic pigments, for example phthalocyanines, quinacridones, perylenes, and also dyes, for example anthraquinones.

Employable nucleating agents include sodium phenylphosphinate, aluminum oxide, silicon dioxide and preferably talc.

The thermoplastic molding materials according to the invention may be produced by processes known per se by mixing the starting components in customary mixing apparatuses such as screw extruders, Brabender mills or Banbury mills and then extruding the resulting mixture. After extrusion the extrudate may be cooled and comminuted. It is also possible to premix individual components and then add the remaining starting materials individually and/or likewise in the form of a mixture. Mixing temperatures are generally in the range from 230° C. to 320° C.

In a further preferred procedure, components B) to E) may be mixed with a prepolymer, formu-lated and pelletized. The pelletized material obtained is then condensed to the desired viscosity continuously or batchwise under inert gas in the solid phase at a temperature below the melting point of component A).

The thermoplastic molding materials according to the invention feature an improved flame retardancy, especially glow wire test, and better mechanics.

They are therefore suitable for the production of fibers, films and moldings of any type. Exam-pies include: plug connectors, plugs, plug parts, cable harness components, circuit mounts, cir-cuit-mount components, three-dimensionally injection-molded circuit mounts, electrical connection elements and mechatronic components.

The moldings or semifinished products to be produced according to the invention from the thermoplastic molding materials can be used by way of example in the motor vehicle, electrical, electronics, telecommunications, information technology, entertainment or computer industry, in vehicles and other means of transportation, in ships, spacecraft, in the household, in sport, in office equipment, in medicine, and also generally in products and parts of buildings requiring increased flame retardancy.

Possible applications of polyamides with improved flowability for the kitchen and household sectors are production of components for kitchen appliances, for example fryers, smoothing irons, knobs/buttons, and also applications in the garden and leisure sector.

EXAMPLES

The following components were used:
Component A1:
Polyamide 66 having an intrinsic viscosity IV of 150 ml/g, measured as a 0.5 wt % solution in 96 wt % sulfuric acid at 25° C. according to ISO 307 (Ultramid® A27 from BASF SE was employed.)
Component B:
50% concentrate of red phosphorus having an average particle size (d50) of 10 to 30 μm in an olefin polymer E1):
59.8 wt % ethylene, 35 wt % n-butyl acrylate, 4.5 wt % acrylic acid and 0.7 wt % maleic anhydride having a melt index MFI (190/2.16) of 10 g/10 min.
The copolymer was produced by copolymerization of the monomer at elevated temperature and elevated pressure.
Component C:
Aluminum salt of phosphonic acid (produced according to WO 2013/083247 A1, example 4) Aluminum phosphite of formula (II):
2958 g of water are initially charged into a 16 l high-pressure stirred vessel, heated to 155° C. and stirred. 3362 g of the aluminum sulfate solution and 2780 g of sodium phosphite solution are then added simultaneously over 30 min. The resulting suspension is discharged and at 80° C. filtered, washed with hot water, redispersed and washed once again. The filtercake was dried in a dryer at 220° C. An alkali metal-aluminum mixed phosphite according to the invention having very high thermal stability was obtained in 85% yield. By atomic spectrometry the reaction product comprises 18.3% Al, 32.0% P, 0.3% S and 0.07% Na. The residual moisture content of 0.1% water was determined by Karl-Fischer titration.
Component C1V:
Aluminum diethylphosphinate (Exolit® OP1230 from Clariant Produkte GmbH).

Component D:
Standard chopped glass fibers for polyamides, length=4.5 mm, diameter=10 μm
Component E2:
In all examples in each case
0.35 wt % Irganox® 1098 and
0.55 wt % commercially available calcium stearate as lubricant and
0.70 wt % of commercially available zinc oxide
Component E3:
30% concentrate of a gas black having a specific BET surface area (measured according to DIN 66131) of 180 $m^2/g$ in polyamide 6.

Production of Molding Materials

To demonstrate the improvements described according to the invention corresponding plastic molding materials were manufactured by compounding. The individual components were mixed in a twin-screw extruder (Berstorff ZSK 26) at a throughput of 20 kg/h and about 270° C. at a flat temperature profile, discharged as a strand, cooled until pelletizable and pelletized.

The test specimens for the investigation set out in table 1 were injection molded on an Arburg 420C injection molding machine at a melt temperature of about 270° C. and a mold temperature of about 80° C.

The test specimens for the stress tests were produced according to ISO 527-2:/1993 and the test specimens for the impact strength measurements were produced according to ISO 179-2/1 eA.

The MVR measurements were performed according to ISO 1133.

The flame retardancy of the molding materials was on the one hand determined by the UL94-V method (Underwriters Laboratories Inc. Standard of Safety, "Test for Flammability of Plastic Materials for Parts in Devices and Appliances", p. 14 to p. 18, Northbrook 1998).

The glow wire resistance GWFI (glow wire flammability index) on sheets was performed according to IEC 60695-2-12. The GWFI is a general suitability test for plastics in contact with voltage-conducting parts. The highest temperature at which one of the following conditions has been met in 3 consecutive tests was determined: (a) no ignition of the sample or (b) afterburn time or afterglow time 30 s after termination of the glow wire exposure time and no ignition of the sub-strate.

The proportions of the components A) to E) in table 1 sum to 100 wt %.

TABLE 1

| Components (wt %) | C1 #6842 (405694 67J0) | C2 #8048 | C3 #8179 | Ex1 #5212 | Ex2 #5074 | Ex3 #2268 |
|---|---|---|---|---|---|---|
| A | 60.4 | 57.4 | 49.73 | 57.4 | 50.2 | 46.87 |
| B + E1 | 12 | | | 12 | 10.2 | 10.2 |
| E1 | | 6 | 6 | | | |
| D | 26 | 26 | 26 | 26 | 36 | 36 |
| C | | 9 | 3 | 3 | 2 | 2 |
| C1V | | | 13.67 | | | |
| E2 | 1.6 | 1.6 | 1.6 | 1.6 | 1.6 | 1.6 |
| E3 | | | | | | 3.33 |
| Analytical results | | | | | | |
| Viscosity number/[cm3/g] | 154 | 159 | 158 | 145 | — | — |
| Elastic modulus/[MPa] | 8325 | 8415 | 8190 | 8454 | 11154 | 11675 |
| Tensile stress at break/[MPa] | 137 | 117 | 120 | 136 | 158 | 162 |

TABLE 1-continued

| Components (wt %) | C1 #6842 (405694 67J0) | C2 #8048 | C3 #8179 | Ex1 #5212 | Ex2 #5074 | Ex3 #2268 |
|---|---|---|---|---|---|---|
| Elongation at break/[%] | 3.5 | 3.2 | 3.0 | 3.4 | 3.1 | 2.9 |
| Charpy impact strength/[kJ/m2] | 69 | 57 | 57 | 70 | 78 | 74 |
| Charpy notched impact strength/[kJ/m2] | 8.2 | 7.0 | 6.8 | 7.7 | — | — |
| MVR 275° C./5 kg/[cm3/10 min] | 30 | 26 | 14 | 29 | 18 | 20 |
| UL94/0.8 mm | V-0 | n.c. | n.c. | V-0 | V-0 | V-0 |
| UL94/1.6 mm | V-0 | n.c. | n.c. | V-0 | V-0 | V-0 |
| GWFI960/1.0 mm - burn times on 3 test speciments/sec | met 58/57/55 | not met >60/>60/>60 | not met >60/>60/>60 | met 39/38/47 | met 39/38/47 | met 39/38/47 |

C1 to C3: Comparative examples
Ex 1 to Ex 3: inventive examples

It is apparent from the data of table 1 that the inventive, synergistic composition exhibits mark-edly shorter burn times in the glow wire test compared to the prior art—especially for thin wall thicknesses.

The invention claimed is:

1. A thermoplastic molding material comprising components:
   A) 10 to 98.5 wt % of a thermoplastic polyamide,
   B) 1 to 20 wt % of red phosphorus,
   C) 0.5 to 15 wt % of an aluminum salt of phosphonic acid,
   D) 0 to 55 wt % of a fibrous or particulate filler or mixtures thereof, and
   E) 0 to 30 wt % of further additives,
   wherein the weight percentages of the components A) to E) sum to 100%.

2. The thermoplastic molding material according to claim 1, comprising the components:
   A) 20 to 97.5 wt % of the thermoplastic polyamide,
   B) 1 to 10 wt % of the red phosphorus,
   C) 0.5 to 15 wt % of the aluminum salt of phosphonic acid,
   D) 1 to 50 wt % of the fibrous or particulate filler or mixtures thereof,
   E) 0 to 25 wt % of the further additives,
   wherein the weight percentages of the components A) to E) sum to 100%.

3. The thermoplastic molding material according to claim 1 in which the component C) is $$Al_2(HPO_3)_3 \cdot x(H_2O)_q \quad \text{(formula I)}$$

where q is in the range of 0 to 4
or $$Al_2M_d(HPO_3)_b(OH)_c x(H_2O)_d \quad \text{(formula II)}$$

where
   M represents alkali metal ions
   a is in the range of 0.01 to 1.5
   b is in the range of 2.63 to 3.5
   c is in the range of 0 to 2
   d is in the range of 0 to 4
or $$Al_2(HPO_3)_e(H_2PO_3)_f x(H_2O)_g \quad \text{(formula III)}$$

where
   e is in the range of 2 to 2.99
   f is in the range of 2 to 0.01
   g is in the range of 0 to 4
or mixtures of aluminum phosphites and aluminum oxide of the type $Al_2(HPO_3)_3$ x 0.1 to 30 $Al_2O_3$ x 0 to 50 $H_2O$    (formula IV)

or primary aluminum phosphonate$[Al(H_2PO_3)_3]$    (formula V)

or basic aluminum phosphonate $[Al(OH)(H_2PO_3)$ $x \cdot 2H_2O]$    (formula VI)

or mixtures thereof.

4. The thermoplastic molding material according to claim 1 containing as the component C) compounds of formula II in which M represents at least one of sodium and potassium.

5. The thermoplastic molding material according to claim 1 in which the component C) is secondary aluminum phosphonate $[Al2(HPO_3)_3]$    (formula Ia)

or aluminum phosphonate tetrahydrate $[Al_2(HPO_3)_3 \cdot 4H_2O]$    (formula Ib)

or mixtures thereof.

6. The thermoplastic molding material according to claim 1 in which the component C) is constructed from mixtures of aluminum phosphites and aluminum oxide of the type $Al_2(HPO_3)_3$ x 0.2 to 20 $Al_2O_3$*0 to 50 $H_2O$ (formula IV).

7. The thermoplastic molding material according claim 1 in which the component C) is constructed from compounds of formula II in which a is in the range of 0.15 to 0.4 and b is in the range of 2.80 to 3 and c is in the range of 0.01 to 0.1.

8. The thermoplastic molding material according to claim 1 in which the component C) is selected from compounds of formula III in which e is in the range of 2.834 to 2.99 and f is in the range of 0.332 to 0.03 and g is in the range of 0.01 to 0.1.

9. A method for producing fibers, films, and moldings, the method comprising using the thermoplastic molding material according to claim 1 for the production of fibers, films and moldings.

10. A fiber, film or molding obtainable from the thermoplastic molding material according to claim 1.

* * * * *